United States Patent
Katayama

(10) Patent No.: US 6,469,483 B2
(45) Date of Patent: Oct. 22, 2002

(54) PWM CONTROL CIRCUIT FOR DC-DC CONVERTER

(75) Inventor: Yasushi Katayama, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/930,233

(22) Filed: Aug. 16, 2001

(65) Prior Publication Data
US 2002/0024826 A1 Feb. 28, 2002

(30) Foreign Application Priority Data

Aug. 29, 2000 (JP) ........................................ 2000-258794

(51) Int. Cl.⁷ ................................................. G05F 1/40
(52) U.S. Cl. ........................ 323/282; 323/288; 323/285
(58) Field of Search ................................. 323/282, 222, 323/288, 284, 285

(56) References Cited

U.S. PATENT DOCUMENTS 5,514,947 A * 5/1996 Berg ............................ 323/282
6,215,290 B1 * 4/2001 Yang et al. .................. 323/282

* cited by examiner

Primary Examiner—Shawn Riley
(74) Attorney, Agent, or Firm—Kanesaka & Takeuchi

(57) ABSTRACT

An error amplification circuit is configured by cascading together an operational amplification circuit and a proportional integration control circuit, both having a fixed operation point (ground potential), so that even when the reference voltage is varied stepwise, the operation points of the circuits maintain as the ground potential. The DC—DC converter is prevented from generating excess output even when the reference voltage provided as the target value varies stepwise.

9 Claims, 5 Drawing Sheets

_US 6,469,483 B2_

PWM CONTROL CIRCUIT FOR DC-DC CONVERTER

BACKGROUND OF THE INVENTION AND RELATED ART STATEMENT

The present invention relates to a PWM (Pulse Width Modulation) control circuit that is comprised of an analog circuit, and is used to match an output voltage from a DC—DC converter with a target value, with the DC—DC converter converting one DC voltage into another DC voltage by turning on and off a semiconductor switch.

FIG. 7 shows a conventional example of a PWM control circuit for a DC—DC converter as described above. In this figure, reference numeral 1 denotes a DC—DC converter for converting one DC voltage into another DC voltage by turning on and off a semiconductor switch and then supplying the resulting DC voltage to a load 3. Reference numeral 4 denotes a PWM control circuit for controlling an output voltage $V_{OUT}$ from the DC—DC converter to a target value, with the PWM circuit being composed of a detection circuit 5, an error amplification circuit 6, a comparison circuit 7, and the like. The detection circuit 5 detects the output voltage $V_{OUT}$ from the DC—DC converter 1 and is composed of, for example, an attenuator, a rectifier, a buffer, an insulated amplifier, or the like. The error amplification circuit 6 amplifies the difference between the output voltage $V_O'$ from the detection circuit 5 and the reference voltage $V_{REF}$. The comparison circuit 7 compares the output voltage $V_E$ from the error amplification circuit 6 with a carrier signal $V_{OSC}$ with a triangular wave or a saw-tooth wave, and outputs a PWM signal.

As described above, the PWM control circuit has the function of feeding back the output voltage from the DC—DC converter and controlling the on/off ratio (duty cycle) of a semiconductor switch, in accordance with the difference from the target value. Specific examples of the DC—DC converter include a buck chopper circuit such as that shown in FIG. 8, a boost chopper circuit such as that shown in FIG. 9, and a buck-boost chopper circuit such as that shown in FIG. 10. In addition, specific examples of the detection circuit 5 and the error amplification circuit 6 are shown in FIG. 11.

In general, the relationship between an input voltage to and an output voltage from an analog amplification circuit is represented by Equation (1):

$$V_2 - V_{bias} = K(V_1 - V_{bias}) \quad (1)$$

where $V_1$ and $V_2$ denote an input voltage to and an output voltage from an analog amplification circuit, respectively, $V_{bias}$ denotes a voltage corresponding to an operation point of the analog amplification circuit, and K denotes a gain of the analog amplification circuit.

The operation point of the conventional error amplification circuit 6 shown in FIG. 11 is the reference voltage $V_{REF}$, that is, $V_{bias}=V_{REF}$. Thus, a problem occurs with the transient response obtained when the $V_{REF}$ is varied. This will be described with reference to FIGS. 12(a) and 12(b).

FIGS. 12(a) and 12(b) show an example in which the DC—DC converter 1 shown in FIG. 7 comprises a voltage-reducing chopper circuit such as that shown in FIG. 8, and in which the detection circuit 5 and the error amplification circuit 6 are configured as shown in FIG. 11. FIG. 12(a) shows an example of an output-voltage waveform from the DC—DC converter obtained when the $V_{REF}$ is varied stepwise as shown in FIG. 12(b).

That is, in a steady state, the output voltage $V_E$ from the error amplification circuit 6 has a certain DC value within the amplitude of the carrier signal $V_{OSO}$ in order to generate a PWM signal of a time ratio corresponding to a target value. In this case, when the $V_{REF}$ is varied stepwise, the operation point $V_{bias}$ of the error amplification circuit 6 simultaneously varies stepwise. Thus, the value of $V_E$ also varies stepwise by an amount corresponding to the variation in $V_{REF}$, as shown by the above Equation (1), and control is then provided so as to achieve a next target value using the resulting $V_E$ value as the initial value. Thus, excess voltage may be generated as shown in FIG. 12(a), regardless of the gain of the error amplification circuit 6.

Accordingly, it is an object of the present invention to improve the transition response while preventing the excess of output voltage from the DC—DC converter using the PWM control circuit.

SUMMARY OF THE INVENTION

To attain the above object, the first aspect of the present invention provides a PWM control circuit for a DC—DC converter comprising a detection circuit for detecting an output voltage from a DC—DC converter that converts one DC voltage into another DC voltage by turning on and off a semiconductor switch, an error amplification circuit for amplifying a difference between the detected voltage and a reference voltage, and a comparison circuit for comparing an output voltage from the error amplification circuit with a carrier signal with a triangular wave or saw-tooth wave, and generating a PWM signal that drives the DC—DC converter. In the invention, the error amplification circuit is configured by cascading together a first analog amplification circuit having a fixed operation point, and a second analog amplification circuit having a fixed operation point, and the first analog amplification circuit is a differential amplification circuit.

In the second aspect of the present invention, the second analog amplification circuit in the first aspect may be a PI (proportional integration) control circuit.

The third aspect of the present invention provides a PWM control circuit for a DC—DC converter comprising a detection circuit for detecting an output voltage from a DC—DC converter that converts one DC voltage into another DC voltage by turning on and off a semiconductor switch, an error amplification circuit for amplifying a difference between the detected voltage and the reference voltage, and a comparison circuit for comparing the output voltage from the error amplification circuit with a carrier signal with a triangular wave or saw-tooth wave, and generating a PWM signal that drives the DC—DC converter. In the invention, the error amplification circuit is configured by synthesizing a differential amplification circuit and a PI control circuit together, and has a fixed operation point.

In the fourth aspect of the invention, the drive power supply for the PWM control circuit in the first to third aspects may be a single positive power supply having a negative-side terminal connected to a ground potential. The comparison circuit or the DC—DC converter may be configured so that the output voltage from the DC—DC converter is at its minimum when the output voltage from the error amplification circuit equals to the amplitude lower-limit potential of the carrier signal. The operation point of the error amplification circuit may be set at a potential between the amplitude lower-limit potential of the carrier signal and the ground potential.

In the fifth aspect of the present invention, when one or more capacitors are connected to a passive element for determining the gain of the error amplification circuit in the fourth aspect, a switch is connected parallel to the capacitors, and the switch is turned on when the DC—DC converter and the PWM control circuit are stopped.

DETAILED DESCRIPTION OF PREFERRED EMBODIMENTS

Figure 1:
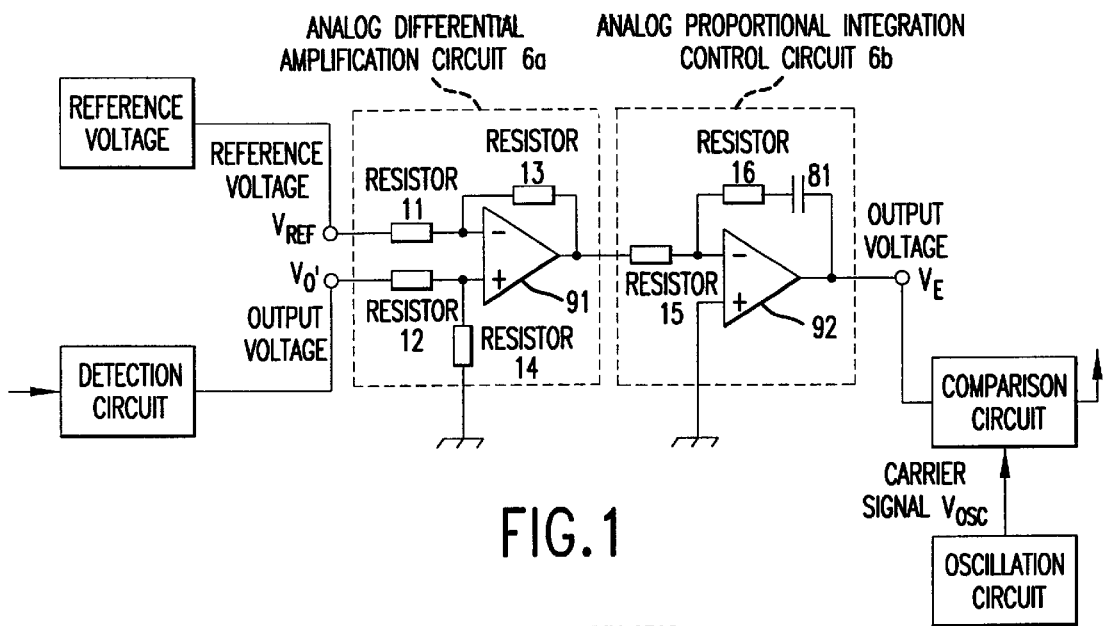
FIG. 1 is a circuit diagram showing a first embodiment of the present invention.
Figure 7:
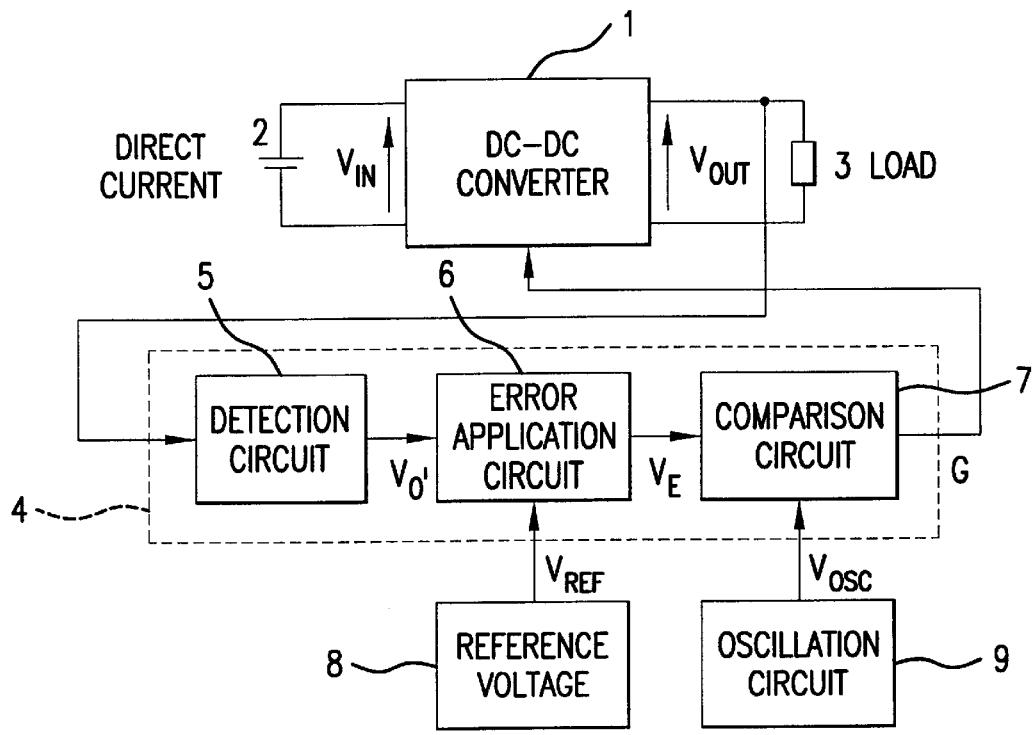
FIG. 7 is a block diagram showing a conventional example of a PWM control circuit for a DC—DC converter.

FIG. 1 is a circuit diagram showing a first embodiment of the present invention. In this embodiment, the error amplification circuit 6 shown in FIG. 7 is configured by cascading together an analog differential amplification circuit 6a composed of an operational amplifier 91 and resistors 11 to 14, and an analog PI (proportional integration) control circuit 6b composed of an operational amplifier 92, resistors 15, 16 and a capacitor 81. In general, the relationship between an input voltage to and an output voltage from the analog differential amplification circuit is represented by Equation (2):

$$V_2 - V_{bias} = K'(V_1' - V_1'') \tag{2}$$

where $V_1'$ and $V_1''$ denote input voltages to the analog differential amplification circuit, and K' denotes a gain of the analog differential amplification circuit. The relationship between the input voltage to and output voltage from the analog PI control circuit is also represented by Equation (1). Further, each of the operation points of the analog differential amplification circuit 6a and analog PI control circuit 6b shown in FIG. 1 is a ground potential.

In FIG. 1, the analog differential amplification circuit 6a and the analog PI control circuit 6b, each being composed of an operational amplifier, are cascaded together. Other circuit configurations, however, are feasible, and the present invention is not limited to the circuit shown in FIG. 1, provided that an analog differential amplification circuit as represented by the above Equation (2) and an analog amplification circuit as represented by the above Equation (1) are cascaded together, and that their operation points are fixed regardless of the $V_{REF}$. Accordingly, a PID control circuit may be obtained by connecting a capacitor parallel to the resistor 15 of the analog PI control circuit 6b, or a P control circuit may be obtained by omitting the capacitor 81.

Figure 8:
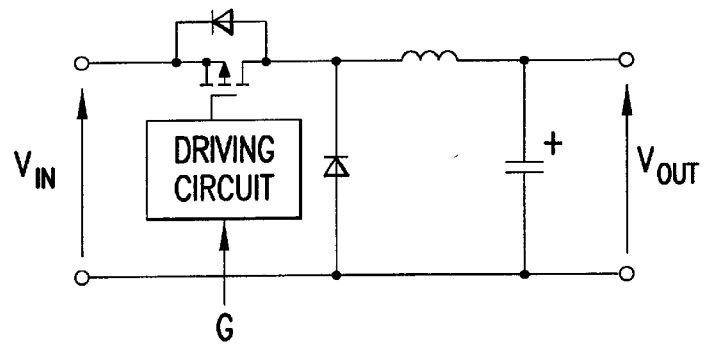
FIG. 8 is a circuit diagram showing a first specific example of the conventional DC—DC converter.
Figure 9:
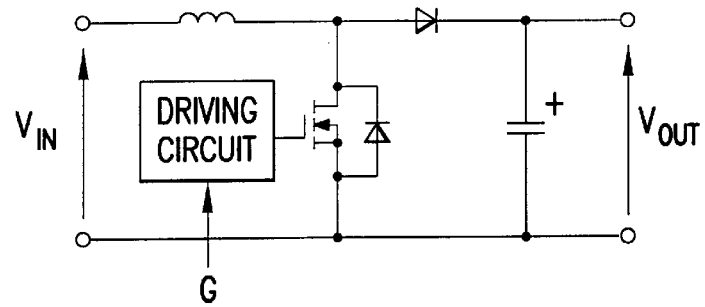
FIG. 9 is a circuit diagram showing a second specific example of the conventional DC—DC converter.
Figure 10:
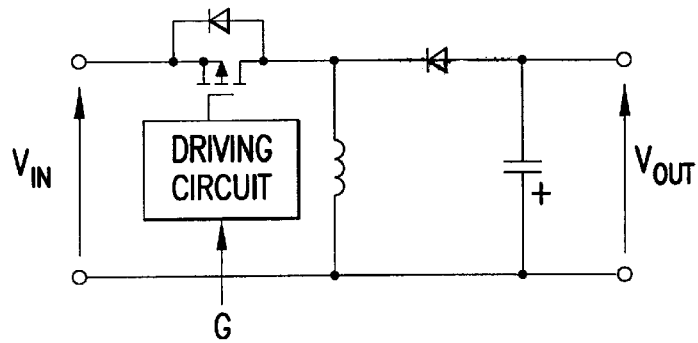
FIG. 10 is a circuit diagram showing a third specific example of the conventional DC—DC converter.
Figure 11:
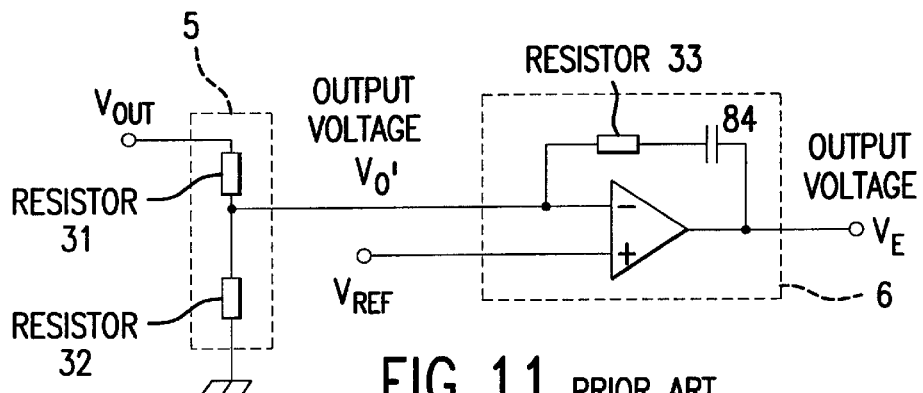
FIG. 11 is a conventional circuit diagram showing a specific example of a detection circuit and an error amplification circuit.
Figure 12A:
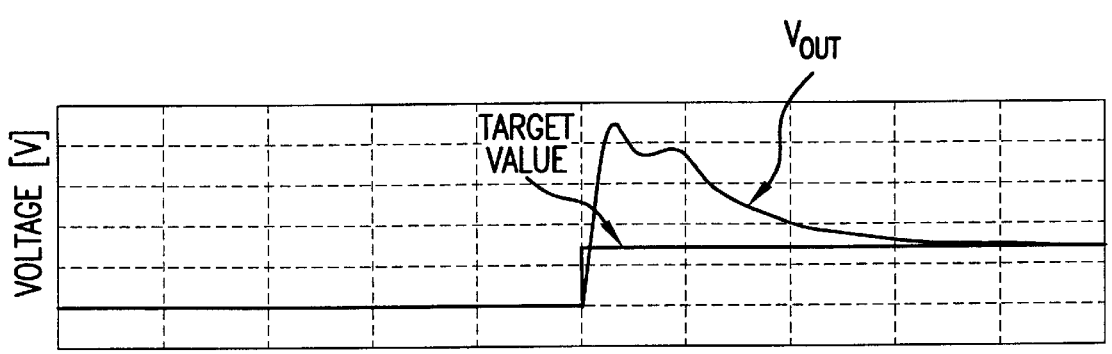
FIGS. 12(a) and 12(b) are explanatory graphs of the operation of the circuit shown in FIG. 11.
Figure 12B:
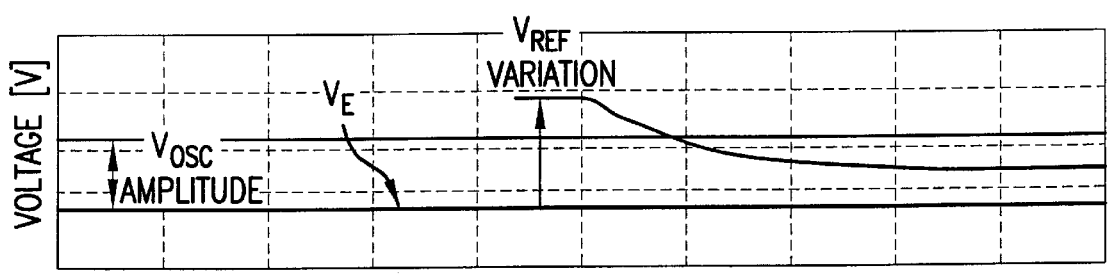
Figure 13A:
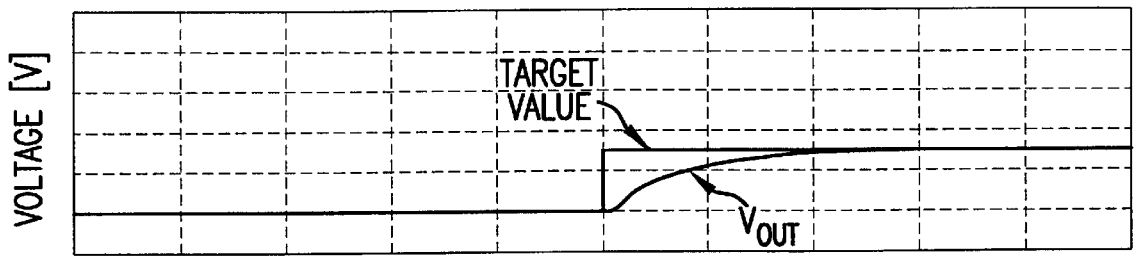
FIGS. 13(a) and 13(b) are explanatory graphs of the operation of the circuit shown in FIG. 1.
Figure 13B:
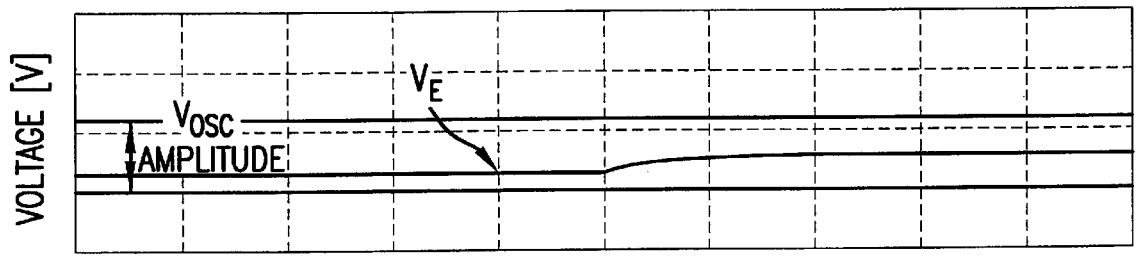

FIGS. 13(a) and 13(b) show an example of an output-voltage waveform of the DC—DC converter 1 shown in FIG. 7, with the waveform being obtained when the DC—DC converter 1 is composed of a voltage-reducing circuit such as that shown in FIG. 8, when the error amplification circuit 6 is configured as shown in FIG. 1, and when the $V_{REF}$ is varied stepwise. That is, in a steady state, the output voltage $V_E$ from the error amplification circuit 6 has a certain DC value within the amplitude of a carrier signal $V_{OSC}$ in order to generate a PWM signal of a time ratio corresponding to a target value (see FIG. 13(b)). The operation points of the analog differential amplification circuit 6a and the analog PI control circuit 6b remain as the ground potential, respectively, even with stepwise variations in the $V_{REF}$. Thus, the $V_E$ does not vary stepwise, unlike the conventional example shown in FIGS. 12(a) and 12(b). As a result, an output voltage $V_{OUT}$ from the DC—DC converter provides a transient response uniquely determined by the gains of the differential amplification circuit and the PI control circuit, while converging at a target value as shown in FIG. 13(a).

Figure 2:
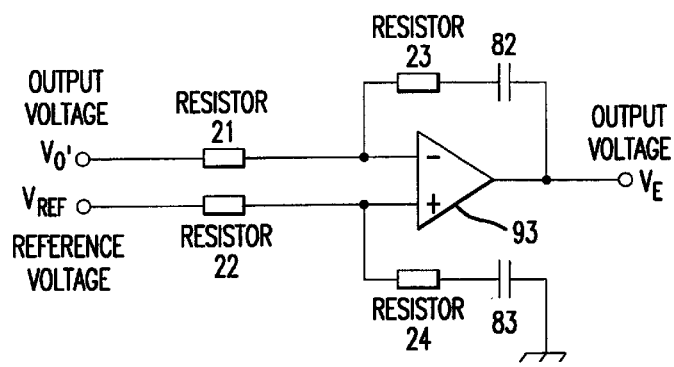
FIG. 2 is a circuit diagram showing a second embodiment of the present invention.

FIG. 2 is a circuit diagram showing a second embodiment of the present invention. In this embodiment, the error amplification circuit 6 shown in FIG. 7 is composed of an operational amplifier 93, resistors 21 to 24, and capacitors 82 and 83, and a transfer function equivalent to that shown in FIG. 1 is realized by a single operational amplifier. As the operational point of this error amplification circuit is also the ground potential, it operates in the same manner as in FIG. 1.

FIG. 2 shows a synthetic circuit equivalent to the analog differential amplification circuit 6a and analog PI control circuit 6b cascaded together as shown in FIG. 1. As in FIG. 1, however, other circuit configurations are feasible, and the present invention is not limited to the circuit shown in FIG. 2, provided that the synthetic circuit is equivalent to an analog differential amplification circuit as represented by the above Equation (2) and an analog amplification circuit as represented by the above Equation (1), with the analog differential amplification circuit and the analog amplification circuit being cascaded together, and that their operation points are fixed regardless of the $V_{REF}$.

Figure 3:
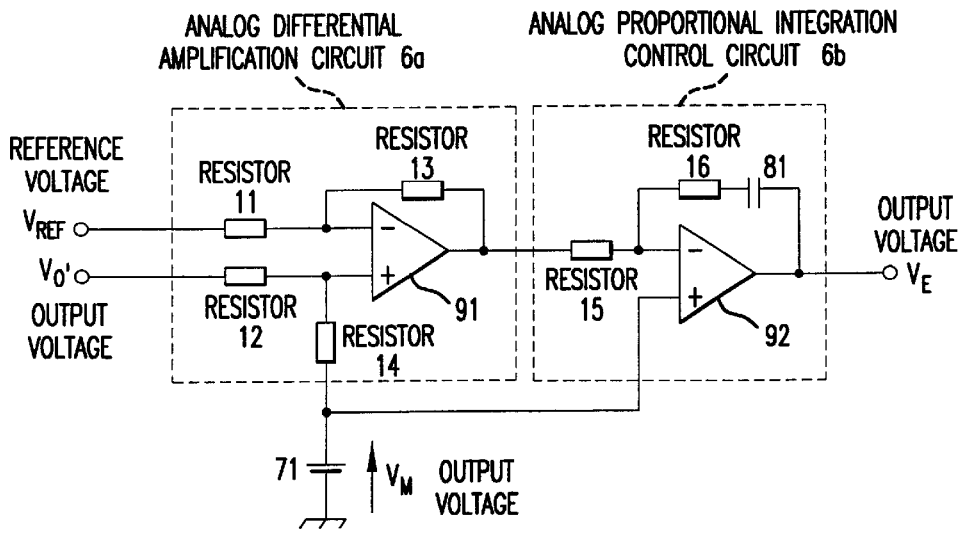
FIG. 3 is a circuit diagram showing a third embodiment of the present invention.

FIG. 3 is a circuit diagram showing a variation of FIG. 1, wherein a DC power supply 71 is added to a location connected to the ground potential shown in FIG. 1. In this case, the operation point is the voltage $V_M$ at the DC power supply 71. That is, the drive power supply to the operational amplifiers 91 and 92 shown in FIG. 3 is a single positive power supply. The comparison circuit 7 or DC—DC converter 1 shown in FIG. 7 is configured so that the output voltage from the DC—DC converter 1 is at its minimum when the output voltage $V_E$ from the error amplification circuit 6 equals to the amplitude lower-limit potential of the carrier signal $V_{OSC}$. The output voltage $V_M$ from the DC power supply 71 is set at a potential between the amplitude lower-limit potential of the carrier signal $V_{OSC}$ and the ground potential.

That is, in the above Equation (1), even in the case of $V_2-V_{bias}=0$, that is, $V2=V_{bias}=V_M$, the output voltage $V_{OUT}$ from the DC—DC converter 1 is zero. Thus, when the PWM control circuit 4 is activated, even if the operational amplifiers 91 and 92 are activated at a time different from that at which the DC power supply 71 is activated so that the DC power supply 71 is started up before the operational amplifiers 91 and 92, the output voltage $V_{OUT}$ of the DC—DC converter 1 can be maintained at zero, thus preventing the generation of an unwanted output voltage.

Figure 4:
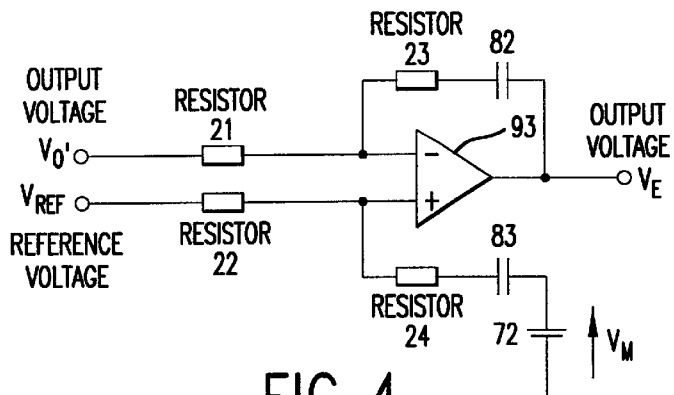
FIG. 4 is a circuit diagram showing a fourth embodiment of the present invention.

FIG. 4 is a circuit diagram showing a variation of FIG. 2, wherein a DC power supply 72 is added to a location connected to the ground potential in FIG. 2. In this case, the operation point is the voltage $V_M$ at the DC power supply 72. That is, the drive power supply to an operational amplifier 93 shown in FIG. 4 is a single positive power supply. The comparison circuit 7 or DC—DC converter 1 shown in FIG. 7 is configured so that the output voltage from the DC—DC converter 1 is at its minimum when the output voltage $V_E$ from the error amplification circuit 6 equals to the amplitude lower-limit potential of the carrier signal $V_{OSC}$. The output voltage $V_M$ from the DC power supply 72 is set at a potential between the amplitude lower-limit potential of the carrier signal $V_{OSC}$ and the ground potential.

Figure 5:
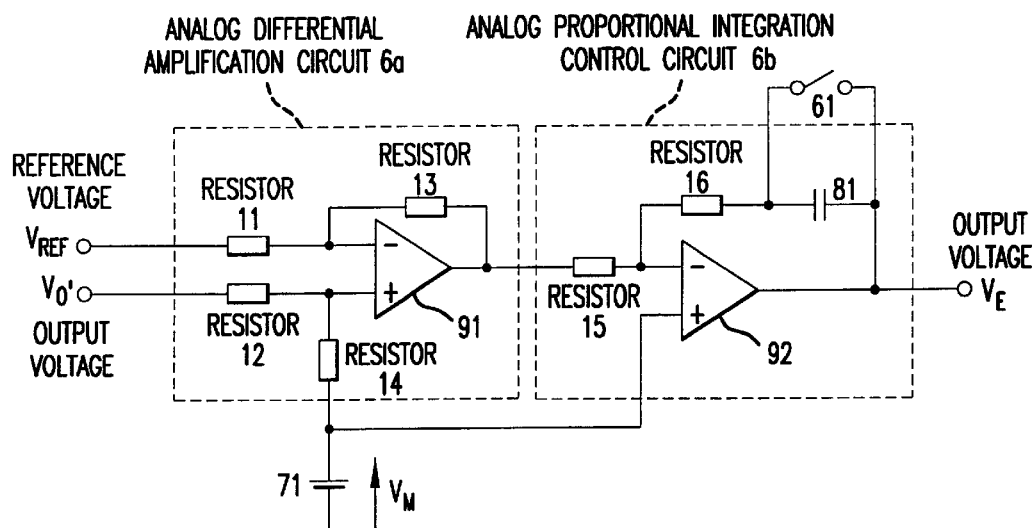
FIG. 5 is a circuit diagram showing a fifth embodiment of the present invention.
Figure 14:
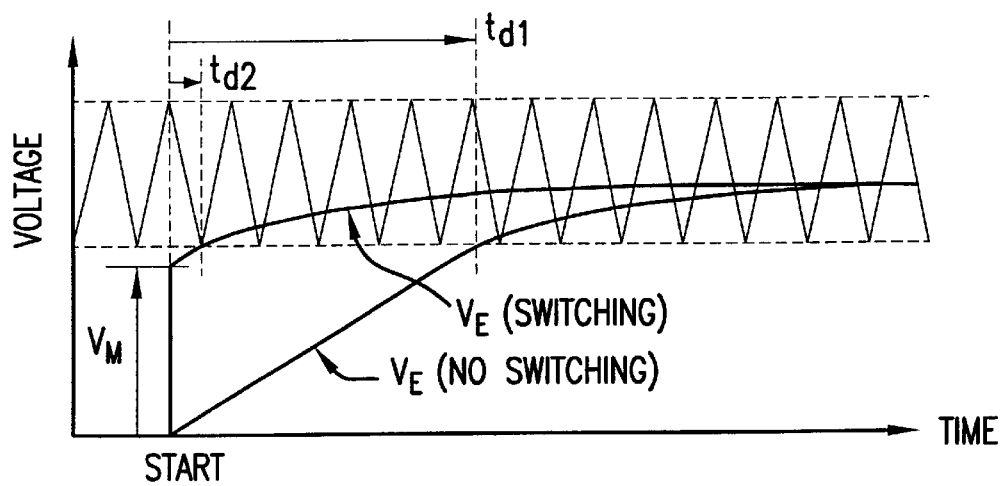
FIG. 14 is an explanatory graph of the operation of the circuit shown in FIG. 5.

FIG. 5 is a circuit diagram showing a variation of FIG. 3, wherein a switch 61 is added parallel to the capacitor 81 shown in FIG. 3. The operation of this circuit will be described with reference to FIG. 14. The drive power supply to the operational amplifier 92 and the DC power supply 71 have already been activated, and the output voltage $V_E$ from the operational amplifier 92 is zero when this amplifier is stopped. In addition, to stop the operational amplifier 92, the switch 61 is turned on and both ends of the capacitor 81 are short-circuited.

When the operational amplifier 92 is activated, $V_E$ simultaneously increases up to $V_M$, the operation point. When the switch 61 is opened after the operational amplifier 92 has been activated, control is started using $V_M$ as the initial value. In this case, without the switch 61, $V_E$ increases slowly while charging the capacitor 81, as represented by the thin line in FIG. 14, so that a large delay occurs before the $V_E$ reaches the lower-limit voltage of the carrier signal $V_{OSC}$, which starts PWM control.

Then, if a passive element for determining the gain of the error amplification circuit is composed of a capacitor, the capacitor is discharged when the error amplification circuit is stopped, to allow the output voltage $V_E$ from the error amplification circuit to rise faster upon activation, thereby reducing the amount of time required to activate the DC—DC converter.

Figure 6:
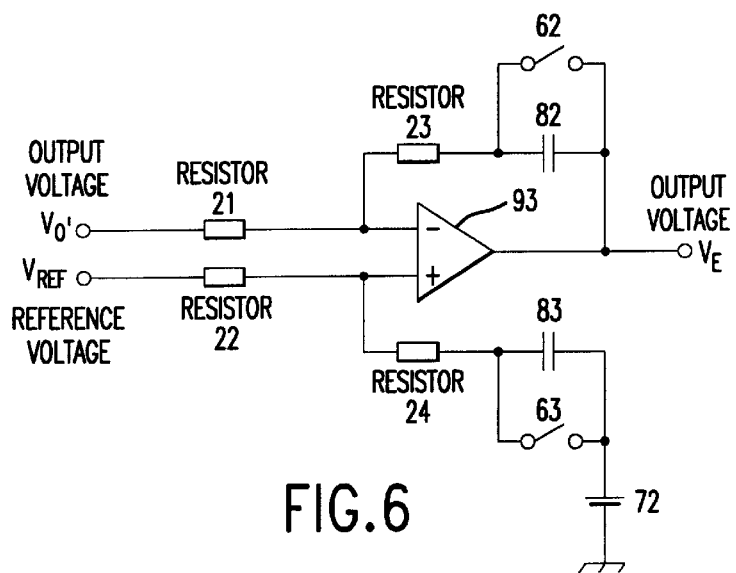
FIG. 6 is a circuit diagram showing a sixth embodiment of the present invention.

FIG. 6 is a circuit diagram showing a variation of FIG. 4, wherein switches 62 and 63 are added parallel to the capacitors 82 and 83 shown in FIG. 4. The operation of this circuit is similar to the operation shown in FIG. 14, so a description thereof is omitted.

According to the first to third aspects of the present invention, the excess voltage occurring in the prior art can be restrained if the output voltage from the DC—DC converter is controlled by varying the reference voltage.

According to the fourth aspect of the present invention, the DC—DC converter can be prevented from generating an unwanted output voltage when the PWM control circuit is activated. According to the fifth aspect of the present invention, the delay in activation in the fourth aspect can be reduced.

While the invention has been explained with reference to the specific embodiments of the invention, the explanation is illustrative and the invention is limited only by the appended claims.

What is claimed is:

1. A PWM control circuit for a DC—DC converter, comprising:

a detection circuit for detecting an output voltage from the DC—DC converter for converting one DC voltage to another DC voltage by turning on and off a semiconductor switch, an error amplification circuit connected to the detection circuit for amplifying a difference between the output voltage from the DC—DC converter and a reference voltage, and including a first analog amplification circuit containing a differential amplification circuit and having a fixed operation point, and a second analog amplification circuit having a fixed operation point, which are connected together by cascading, and a comparison circuit connected to the error amplification circuit for comparing an output voltage from the error amplification circuit with a carrier signal, and generating a PWM signal for driving the DC—DC converter.

2. A PWM control circuit for a DC—DC converter according to claim 1, wherein said second analog amplification circuit is a proportional integration control circuit.

3. A PWM control circuit for a DC—DC converter according to claim 1, further comprising a single positive power supply and a negative-side terminal connected to a ground potential, said comparison circuit or said DC—DC converter being configured so that an output voltage from the DC—DC converter is at its minimum when an output voltage from the error amplification circuit equals to an amplitude lower-limit potential of a carrier signal, and the error amplification circuit has an operation point set at a potential between the amplitude lower-limit potential of the carrier signal and the ground potential.

4. A PWM control circuit for a DC—DC converter according to claim 3, wherein said error amplification circuit includes at least one capacitor connected to a passive element for determining a gain of the error amplification circuit, and a switch connected parallel to the capacitor, said switch being turned on when said DC—DC converter and said PWM control circuit are stopped.

5. A PWM control circuit for a DC—DC converter, comprising:

a detection circuit for detecting an output voltage from a DC—DC converter for converting one DC voltage to another DC voltage by turning on and off a semiconductor switch, an error amplification circuit connected to the detection circuit for amplifying a difference between the output voltage from the DC—DC converter and a reference voltage, said error amplification circuit being formed of a differential amplification circuit and a proportional integration control circuit, and having a fixed operation point, and a comparison circuit connected to the error amplification circuit for comparing an output voltage from the error amplification circuit with a carrier signal, and generating a PWM signal for driving the DC—DC converter.

6. A PWM control circuit for a DC—DC converter according to claim 5, further comprising a single positive power supply and a negative-side terminal connected to a ground potential, said comparison circuit or said DC—DC converter being configured so that an output voltage from the DC—DC converter is at its minimum when an output voltage from the error amplification circuit equals to an amplitude lower-limit potential of a carrier signal, and the error amplification circuit has an operation point set at a potential between the amplitude lower-limit potential of the carrier signal and the ground potential.

7. A PWM control circuit for a DC—DC converter according to claim 6, wherein said error amplification circuit includes at least one capacitor connected to a passive element for determining a gain of the error amplification circuit, and a switch connected parallel to the capacitor, said switch being turned on when said DC—DC converter and said PWM control circuit are stopped.

8. A PWM control circuit for a DC—DC converter according to claim 1, wherein said error amplification circuit is connected to the reference voltage so that when the reference voltage is changed to change the output voltage from the DC—DC converter, a transient response thereof is determined by a control gain of the error amplification circuit.

9. A PWM control circuit for a DC—DC converter according to claim 5, wherein said error amplification circuit is connected to a reference voltage so that when the reference voltage is changed to change the output voltage from the DC—DC converter, a transient response thereof is determined by a control gain of the error amplification circuit.

* * * * *